United States Patent Office 3,361,395
Patented Jan. 2, 1968

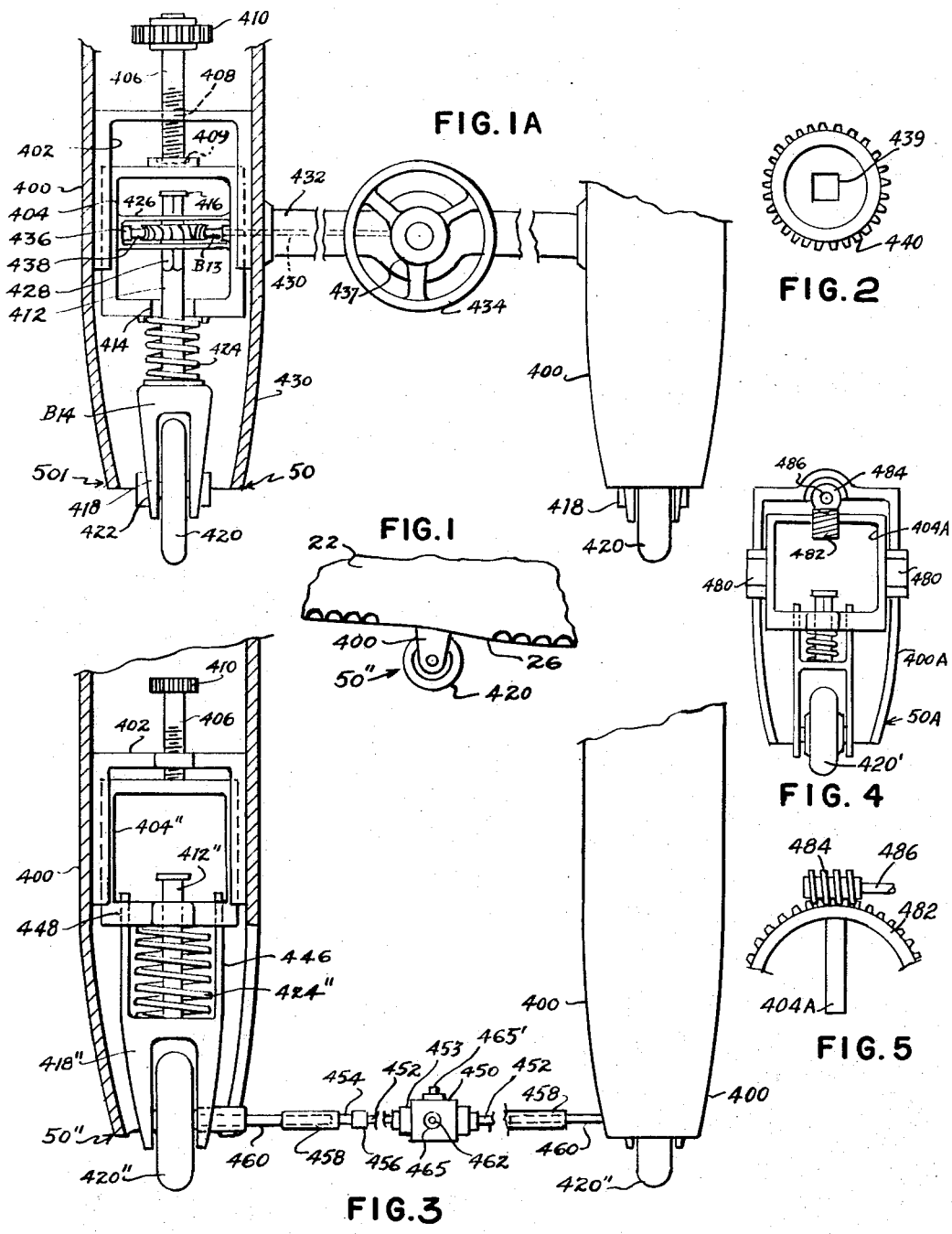

3,361,395
FLYING PLATFORM-AUTOMOBILE-BOAT AND
AIR SUSPENSION CAR COMBINATION
Steven Postelson-Apostolescu, 419 W. 35th St.,
New York, N.Y. 10001
Original application Aug. 27, 1963, Ser. No. 304,926, now Patent No. 3,265,329, dated Aug. 9, 1966. Divided and this application Aug. 25, 1965, Ser. No. 482,532
6 Claims. (Cl. 244—102)

This invention relates generally to aircraft and more particularly to a combination aircraft and land vehicle and this application is a division of my copending application filed Aug. 27, 1963, Ser. No. 304,926, now U.S. Patent No. 3,265,329. The invention relates generally to aircraft which may travel through the air or travel upon a highway with equal facility, wherein the operator of the vehicle may be provided with selective controls for guiding the movement, speed and direction of the vehicle under all conditions.

An important object of the present invention is to provide such an aircraft with novel combined landing gear and driving gear structures that are positive in action and highly efficient in operation.

Other objects and advantages of the invention will be apparent from the description thereof to follow taken in connection with the accompanying drawings wherein:

FIG. 1 is a side elevational view of a fragment of the fuselage of an aircraft embodying the invention.

FIG. 1A is a part elevational and part sectional view of the combined landing gear and steering gear structure shown in FIG. 1 and made in accordance with the invention.

FIG. 2 is a plan view of the worm gear of FIG. 1A.

FIG. 3 is a view similar to FIG. 1A of a landing gear and driving gear structure of the invention.

FIG. 4 is a front elevational, sectional view on a reduced scale of another landing gear structure of the invention.

FIG. 5 is a fragmentary side elevational view of the worm gear and worm of FIG. 4.

Referring now in detail to the various views of the drawings, in FIG. 1A a combined landing gear and steering gear structure is shown and designated generally by the reference numeral 50. Two such structures are shown joined by a sleeve 432. Each such structure is housed in a tubular, hollow, partly cylindrical extension 400 depending from the bottom wall 26 of the fuselage 22 and downwardly open. Each structure includes an inverted U-shaped guide frame 402 secured to the inner surface of the extension. Another closed rectangular shaped frame 404 is slidably mounted on the frame 402. A threaded wheel retracting shaft 406 extends upwardly from the top of frame 404 through a hole 408 in the frame 402. A gear 410 is fixed on the top free end of shaft 406. Another shaft 412, which serves as a wheel carrier, extends upwardly through a hole 414 in the bottom of frame 404. The top 428 of shaft 412 is square and is formed with a head 416 and its bottom has a bifurcated extension 418 to rotatably receive a wheel 420 on a shaft 422 supported by the extension. A coiled spring 424 around the shaft 412 between the bottom of the frame 404 and the bifurcated extension 418 urges the wheel outwardly of the extension. A closed frame 426 fits in the space between the sides of the frame 404. Shaft 412 extends through aligned holes in frame 426. A rotatable shaft 430 extends through a side opening in the extension 400. Shaft 430 extends through the sleeve 432 to a hand wheel 434, which is located in the control chamber of the fuselage 22, not otherwise shown, and has its other end journalled in a bearing 436 in the frame 426. The end of the shaft 430 supports a worm 438 inside frame 426 which meshes with a worm gear 440 on the shaft 412. The worm gear 440 has a square central hole 439 (FIG. 2) conformingly to receive the square portion of the shaft 412 while permitting axial movement. Turning of the hand wheel 434 moves the shaft 430 which in turn moves worm gear 440 which turns the shaft 412 to the right or left as desired, thus providing perfect directional control of the craft when on the ground and used as an automobile. The spring 424 absorbs the landing shocks and permits a soft suspension drive for the craft on the ground.

The landing gear and driving gear 50″ for the rear of the aircraft shown in FIG. 3 differs from the form of combined landing gear and steering gear 50 of FIG. 1A in that the bifurcated extension 418″ of the shaft 412″ is formed with upstanding fingers 446 which extend through holes 448 in the bottom of the closed frame 404″. The holes and fingers guide the up and down movements of the shaft 412″, a wheel 420″ and permit up and down movement but not rotary movement of the bifurcated extension 418″. The bifurcated extension is adapted to be moved up or down carrying the wheel 420″ therealong because of the drive linkage which connects the wheel to a gear box 450. A shaft 452 extends outwardly from each end of the gear box and is operatively connected to the gearing 453 inside the box and controlled by a control lever 465′. Each shaft 452 is connected at its outer end to the end of another shaft 454 by means of a universal joint 456. The other end of shaft 454 is connected to a sliding sleeve 458 telescopically engaging one end of a sliding shaft 460, the other end of the shaft being connected to the wheel 420″ on the bifurcated extension 418″. The gearing in the box is being turned by means of a drive shaft 462 carrying worm 465 inside the gear box and controlled from the afore-mentioned control chamber through the lever 465′.

In operation, when the wheels 420″ are in downward extended position, the universal joint connection permits the wheels to oscillate up and down so as to expand or retract the wheels. In traveling along the ground, the springs 424″ and universal joint 456 permit a soft suspension and permit the wheels to be retracted when flying. The finger and hole suspension of the bifurcated extension permits up and down movements but prevents movement to the right or left of the shaft and wheel.

Yet another landing gear structure 50ª is shown in FIG. 4. This form differs from the form shown in FIG. 1A in that the closed frame 404ª pivots on opposed bearing sleeves 480 extending from the sides of the frame through openings in the cylindrical extension 400ª. The frame is pivoted or oscillated by means of a worm gear segment 482 on the top of the frame meshing with a worm 484 on shaft 486 leading to the control chamber and actuated therefrom for retracting the wheel 420′ which is mounted on the frame 404ª in the manner described above with reference to FIG. 3.

While I have illustrated and described the preferred embodiments of my invention, it is to be understood that I do not limit myself to the precise construction herein disclosed and the right is reserved to all changes and modifications coming within the scope of the invention as defined in the appended claims.

I claim:
1. In an aircraft having an elongated fuselage and a hollow extension depending from the bottom wall thereof, a combined landing gear and steering gear structure in said hollow extension comprising an inverted U-shaped frame fixed to the interior of the extension, a closed frame slidably supported in said U-shaped frame, said closed frame having an opening, a shaft slidably mounted in said opening, said shaft having a bifurcated end, a wheel supported between the bifurcations of said end, the other end of the shaft being square in cross-section, a coiled spring sleeved around the shaft between the closed frame and the bifurcated end thereof, said U-shaped frame having a threaded opening in its bight portion, a threaded shaft turnably supported on the closed frame and extending through said threaded opening for upward and downward movements therethrough, a gear fixed on the outer free end of said threaded shaft for connection to an operating member, said hollow extension and closed frame having aligned lateral openings and means for turning said slidable shaft partly received in said lateral openings.

2. A structure as defined in claim 1, wherein said means for turning said slidable shaft include a rotatable shaft extending through said aligned openings, means for rotating said rotatable shaft, a worm member on rotatable shaft, and a worm gear member on the rotatable and slidable shaft in meshing engagement with said worm member, the member on said slidable shaft having a central opening conformingly receiving said other end of the slidable shaft for preventing rotation of the slidable shaft in said central opening while permitting axial movement.

3. A structure as defined in claim 2 wherein the means for rotating the rotatable shaft includes a handwheel operatively connected to the shaft.

4. In an aircraft having an elongated fuselage and a hollow extension depending from the bottom wall thereof, a combined landing gear and driving gear structure comprising an inverted U-shaped frame fixed to the interior of the extension; a closed frame slidably supported in said U-shaped frame, said closed frame having an opening; a shaft having one end slidably mounted in said opening, the other end of said shaft being bifurcated; a wheel rotatably supported between the bifurcations of said end; a coiled spring sleeved around the shaft between the closed frame and the bifurcated end thereof, said U-shaped frame having a threaded opening in its bight portion, a threaded shaft turnably supported on the closed frame and extending through said threaded opening for upward and downward movement therethrough, a gear fixed on the outer free end of said threaded shaft for connection to an operating member, said closed frame having a pair of spaced holes therein, and fingers fixedly fastened on said bifurcated end and extending through said openings; and drive means for rotating said wheel.

5. An aircraft landing gear and driving gear structure as defined in claim 4 wherein the drive means includes a gear box, a first shaft extending outwardly from the gear box, and operatively connected to the gearing in the box, another shaft operatively connected to said first shaft by means of a universal joint connection, a sleeve connected to said other shaft for rotation therewith, and a third shaft drivingly connected to the sleeve and operatively connected to the wheel.

6. In an aircraft having an elongated fuselage and a hollow extension depending from the bottom wall thereof, the extension having opposed side openings, a landing gear structure in said hollow extension comprising a closed frame having opposed side bearings pivotally mounted in the opposed side openings in the extension, said closed frame having an opening therein, a shaft slidably mounted in said opening, said shaft having a bifurcated end, a wheel supported between the bifurcations of said end, a coiled spring sleeved around the shaft between the closed frame and said bifurcated end thereof, said closed frame having a pair of spaced holes therein, fingers on the bifurcated end of the shaft extending through said spaced holes, a worm gear mounted on the frame opposite the opening therein, a rotatable shaft extending into said extension, a worm fixed on said shaft and meshingly engaging said worm gear for pivoting said frame on said bearings when said rotatable shaft rotates.

References Cited
UNITED STATES PATENTS 2,481,635   9/1949   Wheeler et al. _____ 244—102
3,096,952   7/1963   Roppel _____ 244—12

MILTON BUCHLER, *Primary Examiner.*

P. E. SAUBERER, *Assistant Examiner.*